US010225624B2

United States Patent
Long et al.

(10) Patent No.: US 10,225,624 B2
(45) Date of Patent: Mar. 5, 2019

(54) METHOD AND APPARATUS FOR THE GENERATION OF METADATA FOR VIDEO OPTIMIZATION

(71) Applicant: INTERDIGITAL CE PATENT HOLDINGS, Paris (FR)

(72) Inventors: Bruce Kevin Long, Los Angeles, CA (US); Daryll Strauss, Redondo Beach, CA (US)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/109,634

(22) PCT Filed: Dec. 29, 2014

(86) PCT No.: PCT/US2014/072560
§ 371 (c)(1),
(2) Date: Jul. 3, 2016

(87) PCT Pub. No.: WO2015/103140
PCT Pub. Date: Jul. 9, 2015

(65) Prior Publication Data
US 2016/0330531 A1    Nov. 10, 2016

Related U.S. Application Data

(60) Provisional application No. 62/016,446, filed on Jun. 24, 2014, provisional application No. 61/923,476, filed on Jan. 3, 2014.

(51) Int. Cl.
*H04N 21/84* (2011.01)
*G11B 27/031* (2006.01)
(Continued)

(52) U.S. Cl.
CPC .......... *H04N 21/84* (2013.01); *G11B 27/031* (2013.01); *G11B 27/10* (2013.01);
(Continued)

(58) Field of Classification Search
CPC .. H04N 21/4227; H04N 5/4401; H04N 21/84; G06Q 10/107; H04L 51/18; G11B 2/031; G11B 27/10
See application file for complete search history.

(56) References Cited

U.S. PATENT DOCUMENTS 6,157,396 A    12/2000 Margulis et al.
6,792,045 B2    9/2004 Matsumura et al.
(Continued)

FOREIGN PATENT DOCUMENTS

EP    2066125    6/2009
JP    3904115    1/2007
(Continued)

*Primary Examiner* — Mishawn N Hunter
(74) *Attorney, Agent, or Firm* — Lily Neff

(57) ABSTRACT

A process for improved upscaling and picture optimization in which the original content is analyzed and metadata for the upscaling and optimization of the content is created. The metadata is then provided along with the content to a playback device. The playback device can then use the metadata to improve the upscaling and display of the content.

10 Claims, 5 Drawing Sheets

(51) Int. Cl.
*G11B 27/10* (2006.01)
*H04N 21/234* (2011.01)
*H04N 21/2343* (2011.01)
*H04N 21/235* (2011.01)

(52) U.S. Cl.
CPC ... *H04N 21/2353* (2013.01); *H04N 21/23418* (2013.01); *H04N 21/234363* (2013.01)

(56) References Cited

U.S. PATENT DOCUMENTS

| | | | |
|---|---|---|---|
| 6,870,886 B2 | 3/2005 | Challapali et al. | |
| 7,145,572 B2 | 12/2006 | Dresevic et al. | |
| 8,401,339 B1 | 3/2013 | Anderson | |
| 2003/0043142 A1 | 3/2003 | Ishibashi | |
| 2009/0290645 A1* | 11/2009 | Mabey | H04N 5/23203 375/240.25 |
| 2010/0158099 A1* | 6/2010 | Kalva | H04N 21/23412 375/240.01 |
| 2011/0106879 A1* | 5/2011 | Sung | G06O 50/10 709/203 |
| 2012/0321273 A1* | 12/2012 | Messmer | G11B 27/031 386/224 |

FOREIGN PATENT DOCUMENTS

| | | |
|---|---|---|
| KR | 1020110035648 | 4/2011 |
| WO | WO0045365 | 8/2000 |
| WO | CA2493200 | 1/2004 |
| WO | WO2011103258 | 8/2011 |

* cited by examiner

METHOD AND APPARATUS FOR THE GENERATION OF METADATA FOR VIDEO OPTIMIZATION

CROSS REFERENCE TO RELATED APPLICATIONS

This application claims the benefit, under 35 U.S.C. § 365 of International Application of PCT/US2014/072560, filed Dec. 29, 2014, which was published in accordance with PCT Article 21(2) on Jul. 9, 2015, in English, and which claims the benefit of US provisional application No. 62/016,446, filed Jun. 24, 2014, and US provisional application No. 61/923,476, filed Jan. 3, 2014.

BACKGROUND

Technical Field

The present invention generally relates to video optimization and more specifically to improving the performance of upscaling and playback for specific content and hardware.

Description of Related Art

Currently, upscaling of video content is a generic process. That is, there is no adjustment to the upscaling process based on the content being upscaled or the hardware being used for upscaling and playback of the content.

SUMMARY

A process for improved upscaling and picture optimization in which the original content is analyzed and metadata for the upscaling and optimization of the content is created. The metadata is then provided along with the content to a playback device. The playback device can then use the metadata to improve the upscaling and display of the content.

One embodiment of the disclosure provides a method for optimizing the playback of video content. The method involves receiving video content for optimization, processing the video content to generate metadata for use in optimizing the playback of the video content, and providing the metadata for use in optimizing the playback of the video content.

Another embodiment of the disclosure provides an apparatus for optimizing the playback of video content. The apparatus includes storage, memory and a processor. The storage and memory are for storing data. The processor is configured to receive video content for optimization, process the video content to generate metadata for use in optimizing the playback of the video content, and provide the metadata for use in optimizing the playback of the video content.

Objects and advantages will be realized and attained by means of the elements and couplings particularly pointed out in the claims. It is important to note that the embodiments disclosed are only examples of the many advantageous uses of the innovative teachings herein. It is to be understood that both the foregoing general description and the following detailed description are exemplary and explanatory and are not restrictive of the invention, as claimed. Moreover, some statements may apply to some inventive features but not to others. In general, unless otherwise indicated, singular elements may be in plural and vice versa with no loss of generality. In the drawings, like numerals refer to like parts through several views.

DETAILED DESCRIPTION

Figure 1:
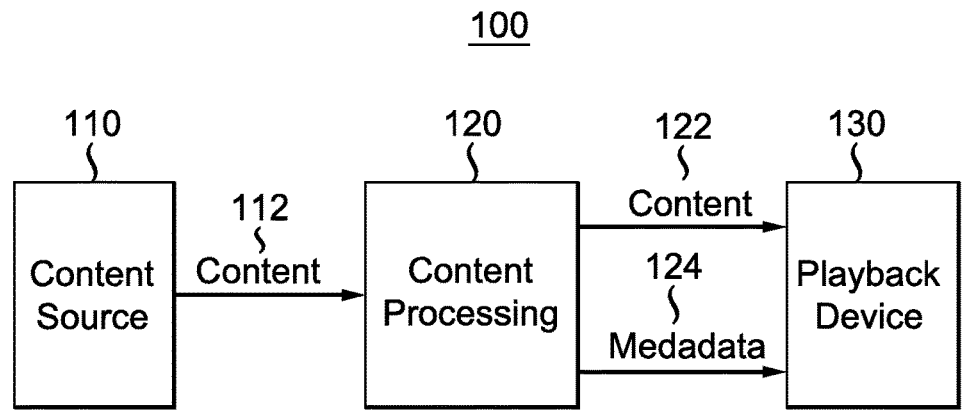
FIG. 1 depicts a block schematic diagram of a system in which video optimization can be implemented according to an embodiment.

Turning now to FIG. 1, a block diagram of an embodiment of a system 100 for implementing content optimization in view of this disclosure is depicted. The system 100 includes a content source 110, content processing 120, and a playback device 130. Each of these will be discussed in more detail below.

The content source 110 may be a broadcast source, camera, server, or other storage device such as a hard drive, flash storage, magnetic tape, optical disc, or the like. The content source 110 provides content, such as video content 112, to content processing 120. The video content 112 may be in any number of formats and resolutions. For example, the content may be in Standard Definition, High Definition (2K) or Ultra High Definition (4K) resolutions. Such video content 112 can also conform to different video profiles such as Main, Extended, Baseline, and the like that are known for different video standards such as MPEG-2, MPEG-4, H.264, H.265, SVEC, and the like.

The content processing 120 is where the video content is analyzed to determine how to best optimize the display of the video content. This can be performed by a person or a computer system, or a combination of both. In certain embodiments, the content processing may also involve encoding of the video content or otherwise changing the format or resolution of the video content 122 for the receipt and decoding by a playback device 130. This change could be changing the content from one profile to a second profile. The content processing 120 provides metadata 124 to accompany the video content 122.

The playback device 130 can be a television, media player, personal electronic device, or the like that is used for the playback and/or display of the content. In accordance with the present disclosure, the playback device 130 receives the metadata 124 along with the video content 122. The playback device 130 can then use the metadata 124 to optimize the playback and/or display of the content 122. In certain embodiments, this includes the up-scaling of the video content from a lower resolution to a higher resolution.

Examples of metadata fields for video processing include:
Metadata—Luminance
Metadata—Chrominance
Metadata—Block Size
Metadata—Bit Depth
Metadata—Motion Vectors
Metadata—Noise Reduction Parameters
Metadata—Motion Estimation
Metadata—Quantization Levels Metadata—Color Information for High Dynamic Range Metadata—Other It is envisioned that such metadata fields and metadata can be used in a processor within playback device 130 to enhance or otherwise optimize the playback of the video content. In one example, playback device 130 has an up-scaling chip (the "VTV-122x" provided by Marseille Networks) that can use received metadata in the up-scaling of received video content for playback.

Figure 2:
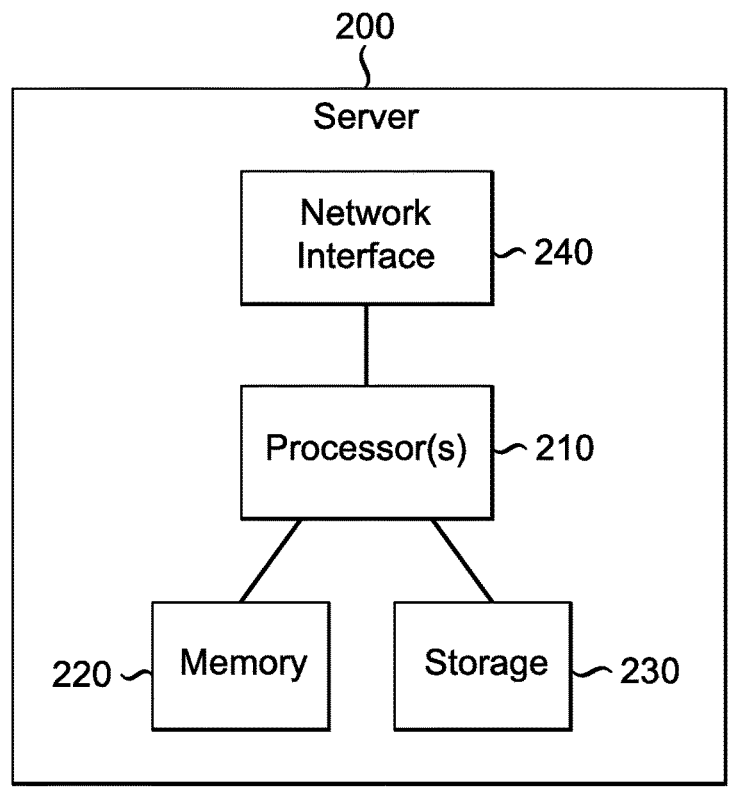
FIG. 2 depicts a block schematic diagram of an electronic device for implementing the methodology of video optimization according to an embodiment.

FIG. 2 depicts an exemplary electronic device 200 that can be used to implement the methodology and system for video optimization. The electronic device 200 includes one or more processors 210, memory 220, storage 230, and a network interface 240. Each of these elements will be discussed in more detail below.

The processor 210 controls the operation of the electronic device 200. The processor 210 runs the software that operates the electronic device as well as provides the functionality for video optimization such as the content processing 120 or playback device 130 shown in FIG. 1. The processor 210 is connected to memory 220, storage 230, and network interface 240, and handles the transfer and processing of information between these elements. The processor 210 can be general processor or a processor dedicated for a specific functionality. In certain embodiments there can be multiple processors.

The memory 220 is where the instructions and data to be executed by the processor are stored. The memory 220 can include volatile memory (RAM), non-volatile memory (EEPROM), or other suitable media.

The storage 230 is where the data used and produced by the processor in executing the content analysis is stored. The storage may be magnetic media (hard drive), optical media (CD/DVD-Rom), or flash based storage. Other types of suitable storage will be apparent to one skilled in the art given the benefit of this disclosure.

The network interface 240 handles the communication of the electronic device 200 with other devices over a network. Examples of suitable networks include Ethernet networks, Wi-Fi enabled networks, cellular networks, and the like. Other types of suitable networks will be apparent to one skilled in the art given the benefit of the present disclosure.

It should be understood that the elements set forth in FIG. 2 are illustrative. The electronic device 200 can include any number of elements and certain elements can provide part or all of the functionality of other elements. Other possible implementation will be apparent to on skilled in the art given the benefit of the present disclosure.

Figure 3A:
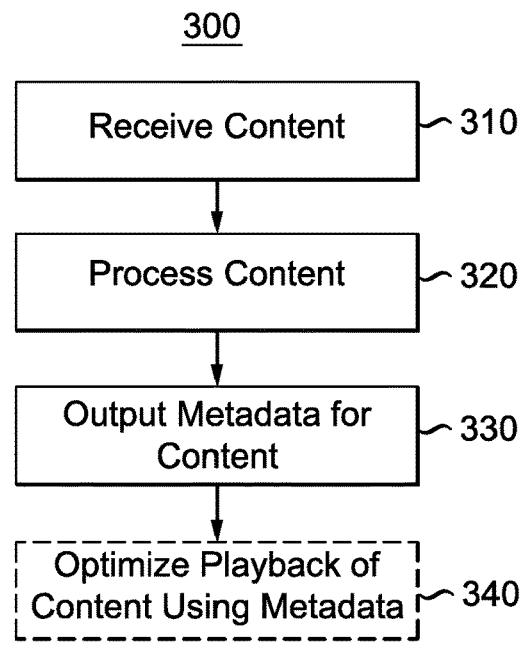
FIG. 3A depicts an exemplary flowchart of a methodology for video optimization according to an embodiment.

FIG. 3A is an exemplary flow diagram 300 for the process of video optimization in accordance with the present disclosure. At its base, the process involves the three steps of receiving video content 310, processing video content 320, and outputting metadata related to the content 330. In certain embodiments, the process further involves optimizing the playback of the content using the metadata 340. Each of these steps will be described in more data below.

As set forth above in reference to FIG. 1, the video content 112 is received from the content source 110 (step 310). The video content 112 can be in any number of formats, profiles, and resolutions. In certain embodiments, the content is provided in standard or high definition resolution.

The processing of the content 112 (step 320) is performed at the content processing 120 of FIG. 1. Here the content is analyzed to determine how to best optimize the display of the content. This can be performed by a person or a computer system, or a combination of both. This can be done in a scene-by-scene or shot-by-shot manner that provides a time code based mapping of image optimization requirements. An example of this can be seen in FIG. 3B.

Figure 3B:
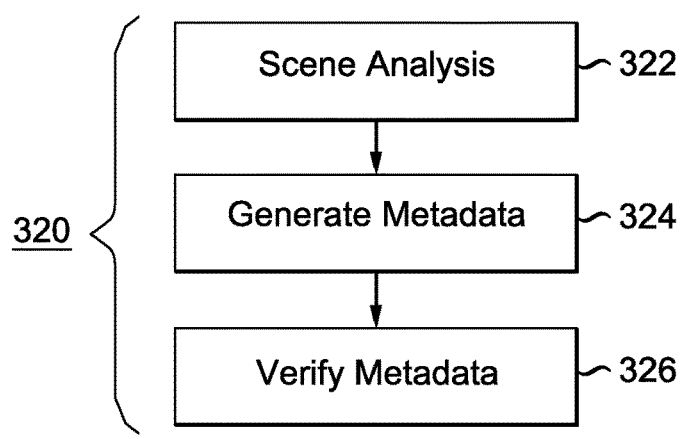
FIG. 3B depicts an exemplary flowchart of a methodology for content processing step of FIG. 3A according to an embodiment

FIG. 3B depicts an exemplary flowchart of one methodology for processing video content (step 320). It involves scene analysis (step 322), metadata generation (step 324), and metadata verification (step 326). Each of these steps will be discussed in further detail below.

In scene analysis (step 320), each scene in the movie is identified and the time codes for the scene are marked. Each scene is then broken down or otherwise analyzed regarding the parameters of the scene that may require optimization. In certain embodiment, the analysis may also include analysis of different areas or regions of each scene.

Some such parameters for optimization include, but are not limited to, high frequency or noise, high dynamic range (HDR), the amount of focus in the scene or lack of focus in the scene, amount of motion, color, brightness and shadow, bit depth, block size, and quantization level. In certain embodiments, the parameters may take into account the playback abilities and limitations of playback hardware performing the eventual optimization. Other possible parameters will be apparent to one skilled in the art given the benefit of this disclosure.

It is then determined how to best optimize the content based on such parameters. In certain embodiments this includes how to best upscale the video content from a lower resolution to a higher resolution. In still other embodiments, this analysis can involve the encoding of the content or otherwise changing the format or resolution of the content for the receipt and decoding by a playback device 130. For example, some scenes may have a high concentration of visual effects, or shots may push into a very detailed image, or may have a very high contrast ratio. These and other situations may require an adjustment to various settings for noise, chroma and scaling to avoid artifacts and maximize the quality of the viewing experience. The optimizations can also account for the abilities or limitations of the hardware being used for the playback or display of the content.

The results of the scene and optimization analysis can be translated or otherwise converted to metadata (step 324). The metadata can be instructions for the playback device 130 as to how to best optimize playback of the content. For example, the metadata can include code or hardware specific instructions for the upscaler and/or decoder of the playback device 130. In certain embodiments the metadata is time synched to the particular scene that was analyzed in the scene analysis process.

Examples of such metadata instructions can include generic parameters such as sharpness, contrast, or noise reduction. The metadata may also include specific instructions for different types of devices or hardware. Other possible metadata will be apparent to one skilled in the art given the benefit of this disclosure.

Once the metadata has been generated (step 324) it can then be verified (step 326) to determine that metadata achieves the desired result or otherwise does not adversely affect the desired optimization, such as upscaling or decoding of content. This can be performed by using the metadata for the desired optimization and reviewing the result. The parameters and/or metadata can then be further adjusted as necessary. Once verified, the metadata is then ready to be provided or otherwise outputted for use in playback optimization.

As set forth above, any of the processing steps can be performed by a human user, a machine, or combination thereof.

As part of this process, a master or reference file can then be created for each piece of content. The file can involve two elements:
1) Element 1: Scene by scene and/or frame by frame analysis of factors that would affect image quality. This analysis would involve both automated and human quality observation of the before and after comparison, and technical description of factors that would affect image quality. By defining these factors, it is viable for an automated authoring system to provide analysis of conditions that are then capable of being tagged for insertion as metadata.
2) Element 2: The metadata can be encoded into an instruction set for the display and up-scaling chips to adjust their settings, thereby optimizing the viewing experience and minimizing the occurrence of artifacts displayed on the screen.

The creation and use of such master or reference list allows for the following in the content pipeline:
1) The up-scaling and display chip, depending on generation, will adjust settings of noise reduction, gamma, scaling etc. This developed metadata can be archived based on the content file, and encoding processes developed to support other manufacturer's up-scaling and image control chips.
2) As higher resolution and new viewing formats evolve, this content pipeline can be adapted to repurpose the Element 1 of the master file to adapt to new formats in a fully automated process for Element 2.

After such processing (step 320) the resulting metadata 124 is outputted (step 330) for use in optimizing the playback of the content (step 340).

As mentioned above, the processing of the content (step 320) may also include, the encoding or otherwise changing of the format or resolution of the content 122 for supply to the playback device 130.

In some embodiments, the metadata for optimization is provided separate from the content to be optimized. In other embodiments, the content can 122 can be provided along with the metadata 124 (step 330). In some such embodiments the metadata 124 can be provided encoded with the content 122. An example of this can be seen in FIG. 4.

Figure 4:
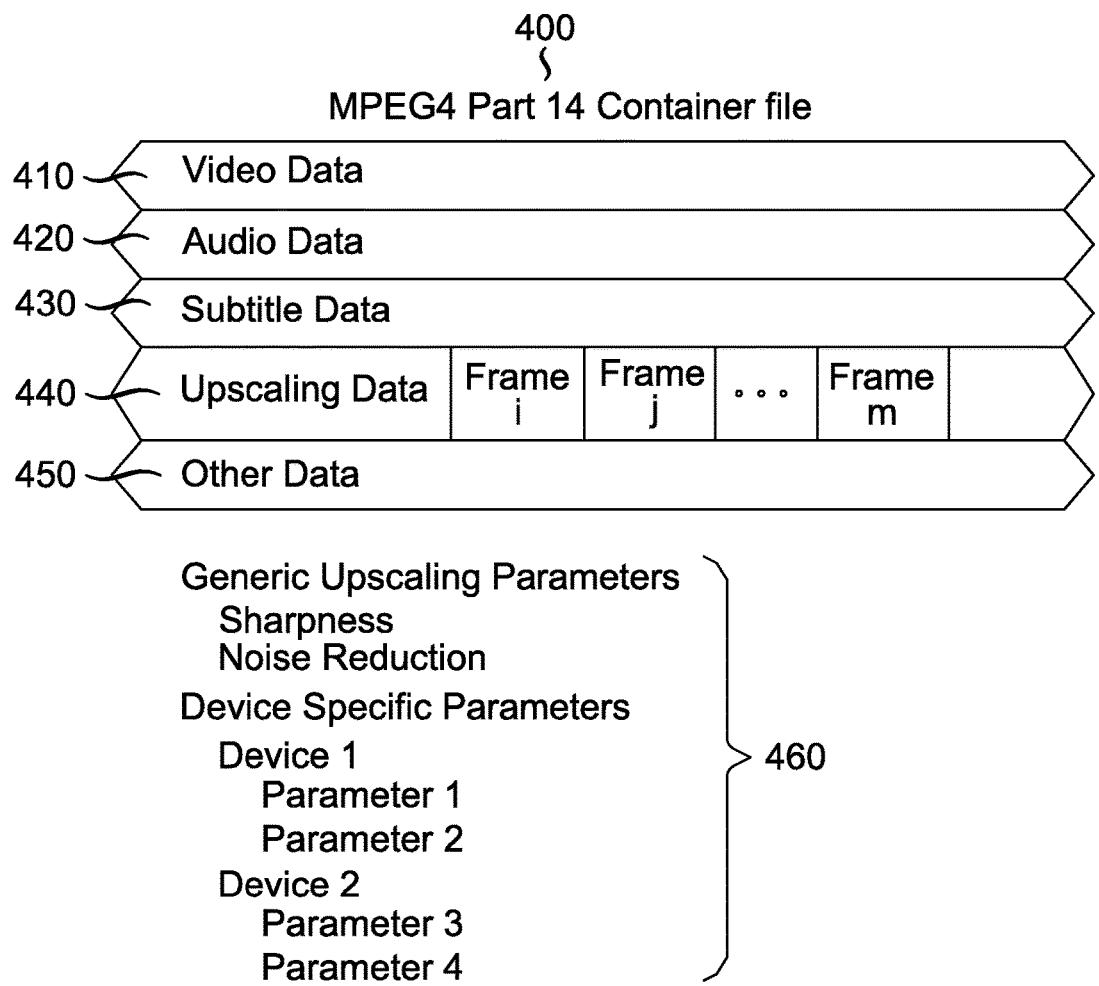
FIG. 4 depicts an exemplary representation of a MPEG4 Part 14 Container file including the metadata for optimization according to an embodiment.

FIG. 4 is exemplary representation of a MPEG4 Part 14 Container file 400. The container file 400 includes video data 410, audio data 420, subtitle data 430, upscaling data 440 and other data 450. The metadata 124 can be provided as part of the upscaling data 440 and/or other data 450. Some examples parameters for the metadata can be seen at 460.

Referring back to FIG. 3A, after the metadata is output (step 330) the metadata can then be used to optimize the playback of the content (step 340). In certain embodiments this is performed by an electronic device, such as shown in FIG. 2, configured for video content playback. Examples of suitable electronic devices for video playback include, but are not limited to, personal computers, portable devices, game systems, video disc players, and media streaming devices. Other suitable devices will be apparent to one skilled in the art given the benefit of this disclosure.

Figure 5A:
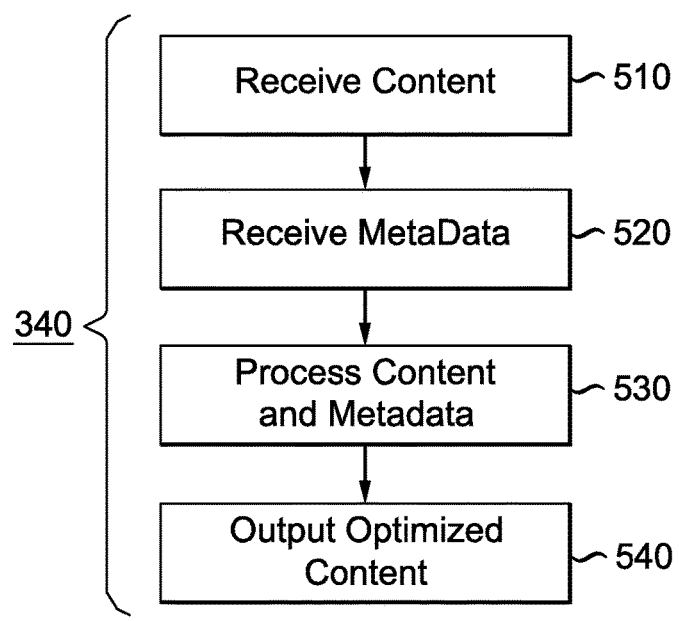
FIG. 5A depicts an exemplary flowchart of a methodology for the optimization of playback of content using metadata step of FIG. 3A according to an embodiment

FIG. 5A depicts an exemplary flowchart of one methodology for optimizing playback of video content using metadata (step 340). It involves the receipt of the content to be optimized (step 510), the receipt of metadata to be used in the optimization (step 520), the processing of the content and data for optimization (step 530) and the output of the optimized data (step 540). Each of these steps will be discussed in further detail below.

The receipt of the content (step 510) can be from a media file provided on storage mediums, such as DVDs, Blu-Rays, flash memory, or hard drives. Alternatively, the content file can be broadcast (terrestrial or satellite), downloaded, or provided as a data file stream over a network. As set forth above, in certain embodiments the content is provided to and received at the playback device in an MPEG format, such as MPEG4 as shown in FIG. 4. Other possible delivery mechanism and formats will be apparent to one skilled in the art given the benefit of this disclosure.

Like the content, the receipt of the metadata (step 520) can be from a media file provided on storage mediums, such as DVDs, Blu-Rays, flash memory, or hard drives. Alternatively, the metadata file can be broadcast (terrestrial or satellite), downloaded, or provided as a data file stream over a network. As set forth above, in certain embodiments the metadata can be provided with the content and provided to and received at the playback device in an MPEG format, such as MPEG4 as shown in FIG. 4. Other possible delivery mechanism and formats will be apparent to one skilled in the art given the benefit of this disclosure.

Figure 5B:
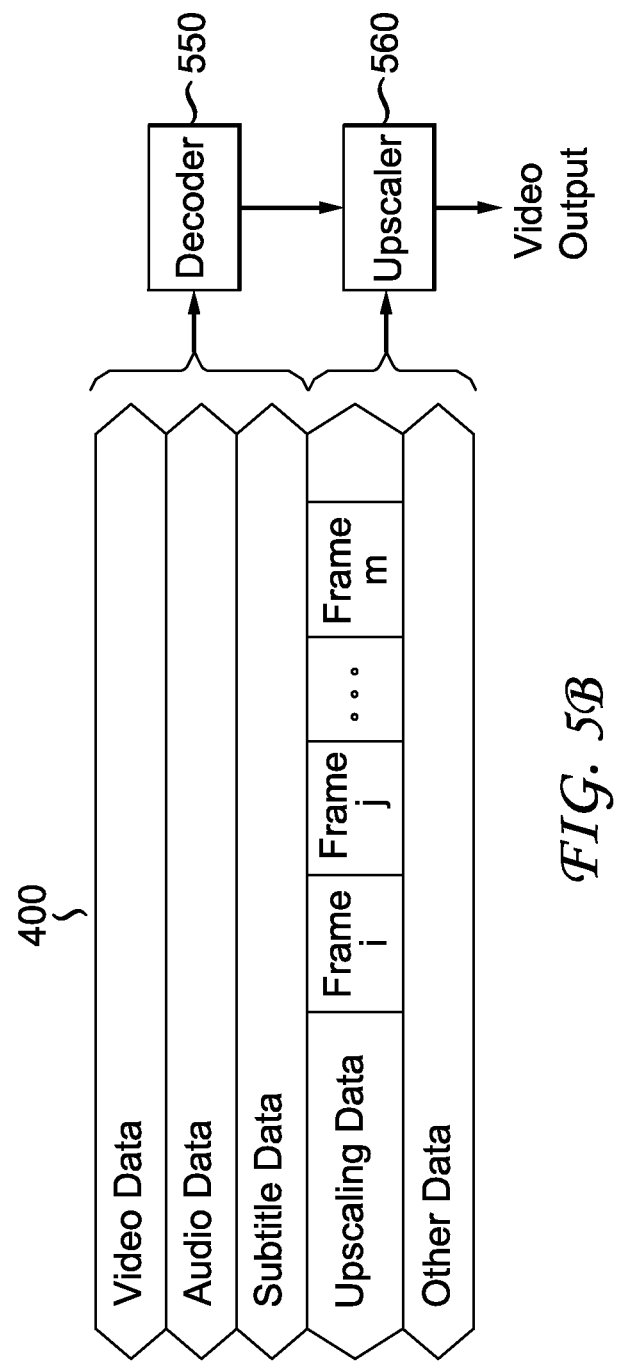
FIG. 5B depicts one example of how the data provided in the container file of FIG. 4 may be used for optimization according to an embodiment.

Once the content and related metadata for optimization are received, the content and related metadata can be processed (step 530). This involves implementing the instructions provided by the metadata for handling or otherwise presenting the content. As such the metadata may include adjustment to various settings for noise, chroma and scaling to avoid artifacts and maximize the quality of the viewing experience. The optimizations of the metadata can also account for the abilities or limitations of the hardware being used the playback or display of the content. FIG. 5B is one example of how the data provided in the container file 400 of FIG. 4 may be handled by the hardware of a playback device 130.

In the example FIG. 5B, the provided metadata is focused on upscaling so the video data 410, audio data 420, subtitle data 430 is processed by the decoder 550 of the playback device 130. The upscaling data 440 and other data 450, including the metadata 124, is processed by the upscaler 560 of the playback device 130. In certain other embodiments other data 350, including the metadata, could also be processed by the decoder 500. The decoder 550 and upscaler can be implemented in software or as dedicated hardware. Other possible implementations will be apparent to one skilled in the art.

Finally, the optimized video content can be outputted (step 540) for playback by the playback device 130 on a display.

The exemplary embodiments provided using the term optimization can also be performed using upscaling, downscaling, up-conversion, down-conversion, any other type of similar operation that changes video content from a first format to a second format and/or changes an attribute of video content during a processing operation, where such a change is controlled by metadata in accordance with the exemplary embodiments.

All examples and conditional language recited are intended for informational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herewith represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Although embodiments which incorporate the teachings of the present disclosure have been shown and described in detail herein, those skilled in the art can readily devise many other varied embodiments that still incorporate these teachings. Having described certain embodiments (which are intended to be illustrative and not limiting), it is noted that modifications and variations can be made by persons skilled in the art in light of the above teachings.

The invention claimed is:

1. A method for processing a video content, the method comprising:
   receiving said video content;
   receiving metadata associated with said video content, said metadata comprising instructions for adjusting parameters representative of quality of said video content, said instructions comprising code or hardware specific instructions, said metadata comprising instructions for adjusting parameters specific to a playback device used for the playback of the video content, said instructions accounting for limitations of the playback device; verifying said metadata to ensure video content is upscaled for playback;
   processing the video content by implementing said instructions; and
   outputting the processed video content for playback.

2. The method of claim 1, wherein said processing comprises upscaling the video content.

3. The method of claim 1, wherein said parameters are representative of quality comprise noise, chroma and scaling parameters.

4. An apparatus for processing a video content, the apparatus comprising:
   a storage for storing the video content and metadata associated with said video content, said metadata comprising instructions for adjusting parameters representative of quality of said video content, said instructions comprising code or hardware specific instructions, said metadata comprising instructions for adjusting parameters specific to a playback device, said instructions accounting for limitations of the playback device; and
   a processor in communication with the storage and, the processor configured to receive said video content and said metadata, process the video content by implementing said instructions and verifying said metadata to ensure video content is upscaled for playback before outputting the processed video content for playback.

5. The apparatus of claim 4 further comprising a network connection for connecting to a network.

6. The apparatus of claim 4 wherein the processor is further configured to upscale the video content when processing said video content.

7. The apparatus of claim 4 wherein said parameters are representative of quality comprise noise, chroma and scaling parameters.

8. A non-transitory computer readable medium containing instructions that when executed perform the steps comprising:
   receiving said video content;
   receiving metadata associated with said video content, said metadata comprising instructions for adjusting parameters representative of quality of said video content, said instructions comprising code or hardware specific instructions, said metadata comprising instructions for adjusting parameters specific to a playback device, said instructions accounting for limitations of the playback device;
   verifying said metadata to ensure video content is upscaled for playback;
   processing the video content by implementing said instructions; and
   outputting the processed video content for playback.

9. The medium of claim 8, wherein said processing comprises upscaling the video content.

10. The medium of claim 8, wherein said parameters are representative of quality comprise noise, chroma and scaling parameters.

* * * * *